United States Patent [19]

Pruett

[11] Patent Number: 5,443,567
[45] Date of Patent: Aug. 22, 1995

[54] TIRE CARCASS SHREDDING METHOD AND APPARATUS

[76] Inventor: Kearney L. Pruett, P.O. Box 297, Keithville, La. 71047

[21] Appl. No.: 327,692

[22] Filed: Oct. 20, 1994

[51] Int. Cl.$^6$ ............... B02C 18/02; B02C 19/12; B02C 23/02
[52] U.S. Cl. .................... 241/29; 241/33; 241/152.2; 241/186.3; 241/199.4; 241/DIG. 31
[58] Field of Search ............ 241/29, 33, 152.2, 199.3, 241/199.4, 186.3, 186.35, 271, DIG. 31

[56] References Cited

U.S. PATENT DOCUMENTS

| 125,699 | 4/1872 | Siegrist . | |
| 400,999 | 4/1899 | Bloomquist . | |
| 3,548,898 | 12/1970 | Napolitano | 144/288 |
| 3,674,067 | 7/1972 | Cooper | 144/288 |
| 3,701,296 | 10/1972 | Snow | 82/54 |
| 3,718,284 | 2/1973 | Richardson | 241/23 |
| 3,733,941 | 5/1973 | Geyer | 82/59 |
| 3,830,120 | 8/1974 | Peterson | 82/54 |
| 3,997,121 | 12/1976 | Motek | 241/78 |
| 4,096,772 | 6/1978 | Hall et al. | 82/82 |
| 4,338,839 | 7/1982 | Farrell et al. | 82/620 |
| 4,405,090 | 9/1983 | Wakeem | 241/3 |
| 4,694,716 | 9/1987 | Sakamoto | 83/112 |
| 4,813,614 | 3/1989 | Moore et al. | 241/23 |
| 5,024,386 | 6/1991 | Morris | 241/3 |
| 5,147,163 | 9/1992 | Booker et al. | 409/199 |
| 5,199,337 | 4/1993 | Parker | 82/83 |
| 5,257,561 | 11/1993 | Folta | 82/165 |
| 5,267,496 | 12/1993 | Roach et al. | 83/133 |
| 5,368,240 | 11/1994 | Bonnet | 241/41 |
| 5,385,307 | 1/1995 | Azar | 241/41 |
| 5,395,061 | 3/1995 | Merklinger | 241/101.7 |

FOREIGN PATENT DOCUMENTS

| 51-41775 | 4/1976 | Japan | 324/83 |
| 52-23785 | 2/1977 | Japan | 241/DIG. 31 |
| 53-1199 | 4/1978 | Japan | 241/3 |
| 53-34235 | 9/1978 | Japan | 83/923 |
| 1079283 | 3/1984 | U.S.S.R. . | |
| 1684062 | 10/1991 | U.S.S.R. . | |

Primary Examiner—Irene Cuda
Assistant Examiner—John M. Husar
Attorney, Agent, or Firm—John M. Harrison

[57] ABSTRACT

The present invention relates to a method and apparatus for shredding annular objects, preferably the carcasses of discarded tires, into multiple uniformly shaped pieces. More specifically, the present invention includes a novel multi-stage apparatus which automatically divides tire carcasses into two side wall sections and a tread section. The apparatus then further divides the wall and tread sections into multiple relatively small, uniform pieces. The pieces so formed are suitable for a variety of purposes, including recycling.

20 Claims, 10 Drawing Sheets 5,443,567

TIRE CARCASS SHREDDING METHOD AND APPARATUS

BACKGROUND OF THE INVENTION

1. Field of the Invention

The present invention relates to a method and apparatus for shredding annular objects, preferably the carcasses of discarded tires, into multiple uniformly shaped pieces. More specifically, the invention includes a novel multi-stage apparatus which automatically divides tire carcasses into two side wall sections and a tread section. The apparatus then further divides the wall and tread sections into relatively small, uniform pieces. The pieces so formed are suitable for a variety of purposes, including recycling.

2. Description of the Prior Art

Ever since Charles Goodyear perfected the sulphur vulcanization of rubber, tires for vehicles of every imaginable design have been made from rubber. However, as was quickly discovered, in order to fabricate a rubber tire having a suitably long operational lifetime, it is necessary to add a host of different additives to the rubber. For instance, carbon black is added in large amounts to rubber in order to impart durability and UV-light stability to the finished tire.

In the years during and immediately following World War II, the use of natural rubber for fabricating tires was largely abandoned, at first due to the war time unavailability of natural rubber and during the 1950's, because of the invention of various synthetic rubbers. However, even synthetic rubbers still must be extensively formulated with various additives in order to yield a commercially acceptable tire.

The last three decades have seen a steady improvement in the synthetic rubber art to the point that tires, automobile tires especially, are now extremely resistant to environmental degradation. This is very beneficial for tire consumers, but presents various persistent problems regarding the safe disposal or recycling of spent tire carcasses.

For instance, because of their annular shape, tires occupy a very large volume of landfill space, even though the actual volume of material which makes up each tire is very small. For this reason, many landfills located near crowded urban areas bar the disposal of tire carcasses because they occupy a disproportionately large volume of precious landfill space. Therefore, waste tire carcasses are often disposed of illegally, or must be transported to more remote landfills where space is not a a premium.

In fact, landfills composed entirely of tire carcasses are known, but are also known to present unacceptably high risks of spontaneous and uncontrollable fires. These fires, in turn, produce huge volumes of thick, noxious and poisonous gases. For instance, a recent fire at a tire dump in Canada burned with such ferocity and produced such a large amount of heat and smoke that the Canadian authorities had no choice but to allow the fire to burn itself out. Unfortunately, this took several months.

Therefore, rather than dispose of tire carcasses, many investigators have focused on recycling the rubber in tires. But because tires are relatively large and come in a great variety of sizes, they cannot be directly subjected to chemical or physical recycling, but must first be altered to yield a uniformly sized product. Therefore, the first step in recycling rubber tires is to shred the tires into small, substantially uniform pieces. The small pieces or "tabs", provide a starting material for recycling, in which the product is characterized by easy handling and a much smaller volume of storage space than the tires themselves. Even if recycling of the tires is not contemplated, shredding tires makes them far easier to store and transport. To that end, a number of tire cutting devices have been described in the patent literature.

For instance, U.S. Pat. No. 3,548,898, issued Dec. 22, 1970, to V. Napolitano, describes a chuck for clamping and inflating a tubeless tire on a rasping machine. The tire is securely clamped between two such chucks and inflated for the purpose of re-treading the tire. Each chuck includes multiple segmental elements having semi-circular surfaces which slidingly engage the bead of the tire workpiece and form a tight seal therewith. A plurality of air channels in communication with the segmental elements is provided to inflate the tire, once a complete seal is formed around the bead of the tire. Rotation of the chucks will then rotate the tire, which is centered between them. The segmental elements which form the seal to the tire bead are interchangeable, so that the apparatus is capable of accommodating tires having different internal diameters.

U.S. Pat. No. 3,701,296, issued Oct. 31, 1972, to J. Snow, describes an apparatus for cutting strips of resilient material from tire treads. The apparatus includes a roller for supporting and rotating a tire and a piston to lift the rotating tire into contact with a first cutting head. The cutting head severs an annular tread section from the tire. The annulus so formed is then removed from the roller and transversely severed by a second blade to yield an elongated strip of resilient tread material. This reference contemplates using the tire material as bumper guards for boat trailers and the like.

U.S. Pat. No. 3,733,941, issued May 22, 1973, to W. Geyer, Jr., describes a single station apparatus which cuts tires circumferentially into annular pieces. The device has a base portion onto which a tire is releasably fixed in a flat, horizontal position. A rotatable shaft, including a blade assembly is disposed within the inner diameter of the tire. The blade assembly is mounted on an adjustable boom which can be made to rotate by rotating the shaft. The boom is adjustable to urge the blade assembly against the outer surface of the tire. By adjusting the boom and rotating the shaft, the tire can be divided into multiple annular pieces. In this reference, it is the tire that remains stationary, while the blade moves about the circumference of the tire.

U.S. Pat. No. 3,830,120, issued Aug. 20, 1974, to H. Peterson, describes yet another tire cutting apparatus in which a tire work piece is mounted in a vertical position upon a hydraulically movable mandrel. The tire is then lifted by the mandrel to contact a stationary rotating blade, which cuts the tire circumferentially.

U.S. Pat. No. 4,096,772, issued Jun. 27, 1978, to W. Hall, et al., describes a vertical tire slitting apparatus which includes external guide means that contact the side walls of the tire being rendered. In contrast to the Peterson device, the cutting head of this apparatus fits inside the annulus of the tire and penetrates the inner surface of the tire, rather than the outer surface. The apparatus includes a frame, a cutter head which fits inside the tire workpiece and a tire drive mechanism attached to the frame to rotatably drive the tire about the cutter head, thereby slitting the tire into multiple annular pieces.

U.S. Pat. No. 4,338,839, issued Jul. 13, 1982, to Farrell, Sr. et al., describes an apparatus for cutting a waste tire into segmental pieces, rather then annular pieces. The apparatus includes a cutting head having multiple pairs of movable blades mounted on a hydraulic ram and several pairs of stationary blades mounted on a base. A tire workpiece is laid flat, below the cutting head and directly on top of the stationary blades and the ram is used to drive both the movable and stationary blades through the tire, thereby cutting the tire into multiple segments.

U.S. Pat. No. 4,694,716, issued Sep. 22, 1987, to T. Sakamoto, describes an apparatus similar to Farrell, Sr., et al., above, except that there is only one upper blade assembly, which is mounted on a rotatable shaft and driven by a hydraulic ram. Between the blade assembly and the tire workpiece is a presser plate having slits which are in registration with the blades of the blade assembly. The presser plate prevents pieces of the cut tire from becoming lodged in the voids between the individual cutting blades. In operation, a tire workpiece is placed horizontally below the cutting press and the presser plate is urged against the tire to compress it. The blade assembly is then lowered through the slits in the presser plate to cut the tire. The blade/presser plate assembly is then retracted and rotated slightly. The process can then be repeated to further render the tire.

U.S. Pat. No. 5,024,386, issued Jun. 18, 1991, to A. Morris, describes an apparatus which first de-beads a tire, and then cuts the tire workpiece diametrically to yield at least two U-shaped segments. The individual segments are then spread flat and fed into a shredder while held in the flattened position.

U.S. Pat. No. 5,147,163, issued Sep. 15, 1992, to Booker, et al., describes another vertical tire splitting device which includes an open-top box having adjustable floor members, into which a tire is placed in a vertical orientation. A mechanism is provided to firmly anchor and rotate the tire slightly more than one revolution, while contacting the tire with a cutting blade. The blade severs the bead or the tread of the tire from the tire carcass in one revolution of the tire. The adjustable floor members are then manipulated to move the slitted tire carcass from the box.

U.S. Pat. No. 5,199,337, issued Apr. 6, 1993, to J. Parker, describes a horizontal tire shredding apparatus in which the tire is supported on a horizontal, rotatable support and rotated by diametrically opposed drive means. Diametrically opposed cutting means are then contacted with the tire to cut it circumferentially.

U.S. Pat. No. 5,257,561, issued Nov. 2, 1993, to E. Folta, describes a locking chuck-type assembly for securely holding tires. The assembly has two disengageable halves which can be releasably engaged to one another with a tire securely clamped in between the two. The assembly is rotatable and once the tire is secured, the tire can be balanced, graded, ground and further processed.

U.S. Pat. No. 5,267,496, issued Dec. 7, 1993, to R. Roach, et al., describes a vertical tire cutting apparatus which radially cuts the tire using a star-like cutting head. The tire is first placed inside a vertical housing and clamped between twelve sets of jaws so that the two beads of the tire actually touch. A radially-arranged blade assembly having multiple blades in a vertical orientation is then driven through the compressed tire, thereby shredding it into several U-shaped pieces. The tire is never cut circumferentially.

The following patent references, both United States patents and patents granted by foreign nations, are believed to contain teachings which are cumulative to the above-discussed patents: U.S. Pat. No. 4,405,090, issued Sep. 20, 1983, to D. Wakeem; U.S. Pat. No. 3,674,067, issued Jul. 4, 1972, to D. Cooper; U.S. Pat. No. 125,699, issued Apr. 16, 1872, to I. Siegrist; U.S. Pat. No. 400,999, issued Apr. 9, 1889, to F. Bloomqvist; Japanese Patent No. 51-41775, issued April 1976; Japanese Patent No. 52-23785, issued February 1977; Japanese Patent No. 53-11999, issued April 1978; Japanese Patent No. 53-34235, issued September 1978; Soviet Union Certificate No. 1079283 A, issued March 1984; and Soviet Union Certificate No. 1684062 A1, issued October 1991.

It is an object of this invention to provide a new and improved tire shredding apparatus which separates the tread from the side walls of the tire and shreds both the tread and the side walls in separate cutting operations.

Another object of the invention is to provide an automated tire cutting or shredding apparatus which automatically sizes a tire, rotates the tire in the presence of a cutter blade, cuts the tire into three pieces to define a tread section and two side wall sections and subsequently cuts the side wall sections and, optionally the tread, into small pieces.

These and other objects of the invention are provided in:

An automated tire shredding apparatus which includes:

1. a releasable tire orienting and rotating mechanism for engaging and vertically orienting and rotating a tire;

2. a prime mover operationally connected to the releasable tire orienting and rotating means by power transmitting elements;

3. a movable cutter head, including at least two adjustable cutter head blades, the cutter head and cutter head blades movably engageable with the tire when the tire is rotated by the releasable tire orienting and rotating mechanism, the cutter head blades capable of cutting circumferentially through the tire;

4. two tire side wall conveyor means, having a floor, two walls, an inlet end and an outlet end, the inlet end dimensioned and configured to retain a tire side wall in a substantially vertical orientation and the outlet end dimensioned and configured to retain a tire side wall in a substantially horizontal orientation and the two walls gradually sloping to connect the inlet end to the outlet end;

5. two horizontally disposed radial blade assemblies, one of which is disposed adjacent to the outlet end of each of the side wall conveyors, respectively, each of the radial blade assemblies having multiple, radially disposed blades;

6. two press heads, one of which is operationally disposed adjacent to one of the radial blade assemblies and the other operationally disposed adjacent to the other of the radial blade assemblies, each of the press heads capable of reciprocating between a first position removed from the radial blade assemblies for receiving a tire side wall and a second position flush with the radial blade assemblies for radially cutting a tire side wall; and 7. a prime mover such as a motor and belt system operationally connected to the press heads, wherein the tire is circumferentially cut by the cutter head blades to define a tire tread and a pair of tire side walls and the tire side walls are transported by rotational momentum to the radial blade assemblies, where the tire side walls are radially cut into pieces responsive to operation of the radial blade assemblies, the radially-disposed blades and the press heads.

A method of shredding a tire having a main axis of rotation into multiple substantially uniformly-sized pieces, which includes the steps of;

1. orienting and releasably and rotatably fixing the tire such that the main axis of rotation is horizontal;
2. rotating the tire about the main axis of rotation;
3. contacting the rotating tire with a pair of cutting blades for circumferentially slitting the tire into a center tread section and right and left side wall sections, each of the right and left side wall sections rotating about the main axis of rotation, wherein the center tread section falls free of the right and left side wall sections and the center tread section is transported by its rotational momentum away from the right and left side wall sections;
4. releasing the right and left side wall sections, such that the right and left side wall sections are each transported by their rotational momentum to one of two radial cutting presses;
5. biasing each of the right and left side wall sections against a blade assembly, the blade assembly including multiple blades; and
6. radially cutting each of the right and left side wall sections into multiple substantially uniformly-sized pieces by operation of the blades.

SUMMARY OF THE INVENTION

The present invention relates to a method and an automatic multistage apparatus for shredding tires, or any other annular, elastomeric object, into small, uniformly sized tabs. In one embodiment, the tire shredder has four stations: a first station, called a tread mill, for cutting the tire side walls from the tire tread; two identical second stations, called radial side wall presses, for further rendering the right and left side wall sections and a third station, called a radial tread press, for further rendering the tread section of the tire.

The tire workpiece is introduced in a vertical orientation into the tread mill (i.e., the tire has a horizontal axis of rotation). Prior to entering the tread mill, the tire is scanned by sensors to determine its diameter or height, as well as its tread width and side wall width. Once inside the tread mill, aided by the data gathered from the sensors, the tire is firmly grasped by multiple finger elements mounted on two rotatable spindles, one spindle on each side of the tire. The fingers anchor and center the tire on the tread mill. The tire is then rotationally accelerated and contacted with a cutter head having at least two fixed, or two rotating blades. The cutter head circumferentially splits the tire into two O-shaped side wall sections and an annular tread section.

After the circumferential cuts have been made in the tire workpiece, the present apparatus utilizes the rotational momentum of the spinning tire parts to transport the cut tire sections to the respective conveyors. Once the tire has been split, the finger elements are retracted to release the spinning side wall sections and one of each of the two side wall sections is transported by its own momentum onto one of two side wall conveyors. Each conveyor leads to one of the radial side wall presses. Within the radial side wall presses, each side wall section is caused to lie flat on top of a radial blade assembly having multiple blades. A press head is then urged against the side wall section with great force, pushing the side wall section through the blades. The tire side wall section is thereby diametrically severed into multiple, roughly pie-shaped tabs.

After the circumferential cuts are made in the tire, the center section, i.e., the tread section, falls free of the right and left side wall sections and is transported by its rotational momentum straight forward and into a storage bin. The tread section can either be used or disposed of as is, or it can be manually placed into a tread-cutting press, which is functionally identical to the side wall presses. The tread section is then rendered into multiple relatively small, uniform pieces in the same fashion as the side walls.

In many, if not most instances, pieces of the rendered tires will become lodged in the voids between the blades of each radial blade assembly. There is no need, however, to clear the blade assembly because the next tire which is run through the apparatus will be forced into the blade assembly just like the initial tire, which will push the lodged pieces of the initial tire from the blade assembly. The tire pieces so dislodged then fall through an open housing, where they land on a discharge conveyor and are transported away from the shredding apparatus.

In this manner, the present apparatus automatically renders tires (or any annularly shaped elastomeric article) into a large number of relatively small, uniform tabs which are suitable for storage, disposal or recycling. Additionally, the invention reduces manual labor and energy consumption by utilizing the rotational momentum of the annular workpiece to transport the workpiece from the first circumferential cutting station to the radial cutting presses.

DESCRIPTION OF THE PREFERRED EMBODIMENTS

Reference is made herein to the attached drawings and identical reference numbers are used throughout the various drawings to designate the same or similar elements of the claimed tire shredding apparatus.

Figure 1:
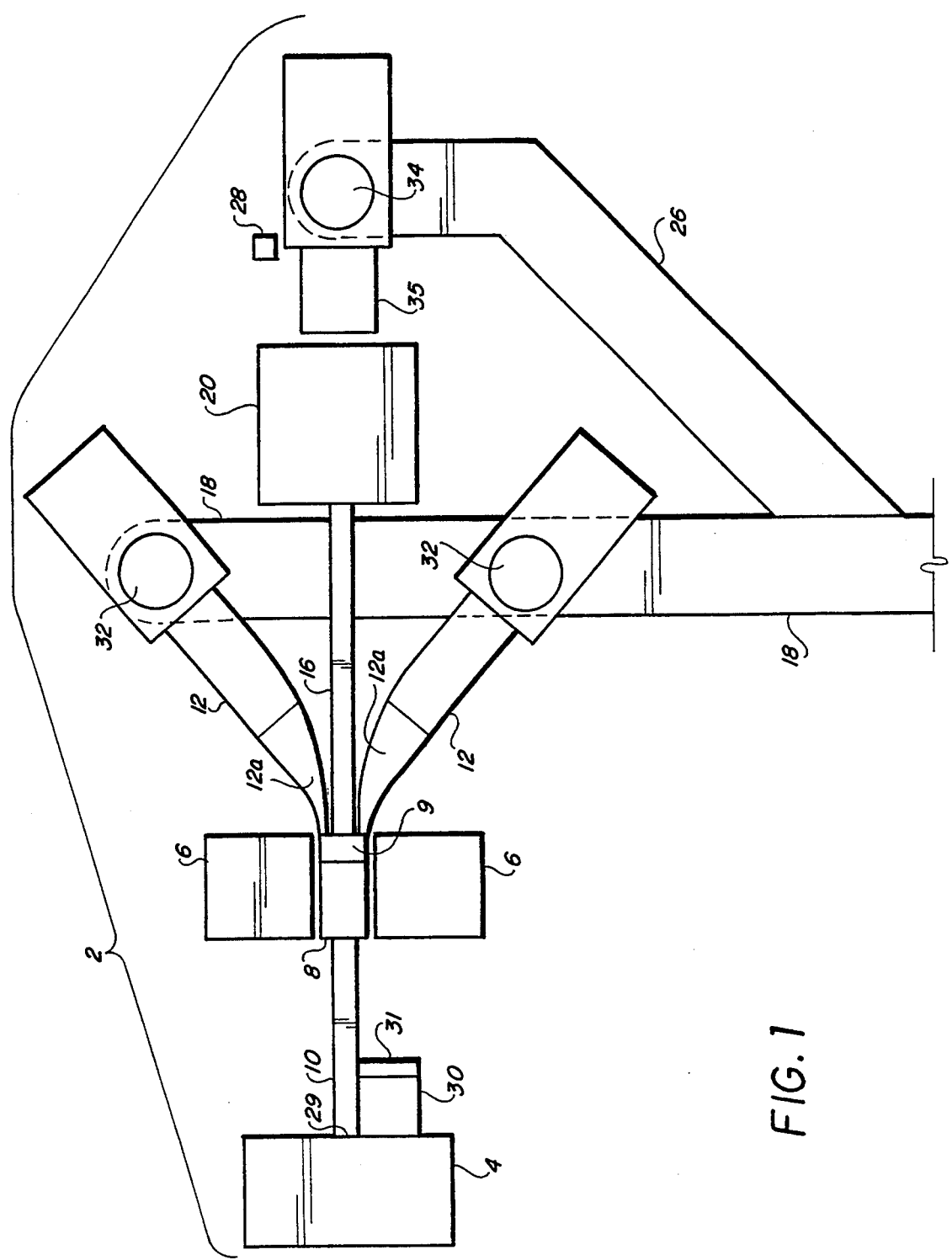
FIG. 1 is a top plan schematic view of the tire shredding apparatus according to the present invention.

Referring initially to FIG. 1 of the drawings, the tires 100 successively enter the tire carcass shredding apparatus 2 from a tire storage bin 4. A tire 100 is placed vertically on the tire input chute 10 (i.e., with its main axis of rotation defining a horizontal line), where it rolls past a tread width sensor 30, a height sensor 29 and a side wall width sensor 31 and then enters a tread mill 8. Inside the tread mill 8, the tire 100 is stopped by a rotatable bumper 48, firmly gripped, oriented and centered relative to a cutter head 9 and is rotated to a speed of from about 120 to 140 revolutions per minute by two rotary transfer units 6. (The rotary transfer units 6 will be discussed in greater detail, below.)

When the tire 100 has reached a suitable rotational speed, the cutter head 9 is contacted with the rotating tire 100, which renders at least two circumferential cuts in the tire between the side walls of the tire 100 and the tread. The two cuts divide the tire 100 into three sections: Two circular-shaped side wall sections and an annular tread section.

Immediately after the two cuts are made in the tire 100, the cutter head 9 is retracted and the dual rotary transfer units 6 are disengaged from the tire 100. The three tire sections, now released from the rotary transfer units 6, are transported by their rotational momentum out of the tread mill 8. One of each of the two side wall sections is transported into one of each of the curved side wall conveyors 12, through a guide trough 12a. The center tread section is carried by its momentum straight forward and onto a tread conveyor 16. The tread section rolls along the tread conveyor 16 and into a tread storage bin 20.

Figure 5:
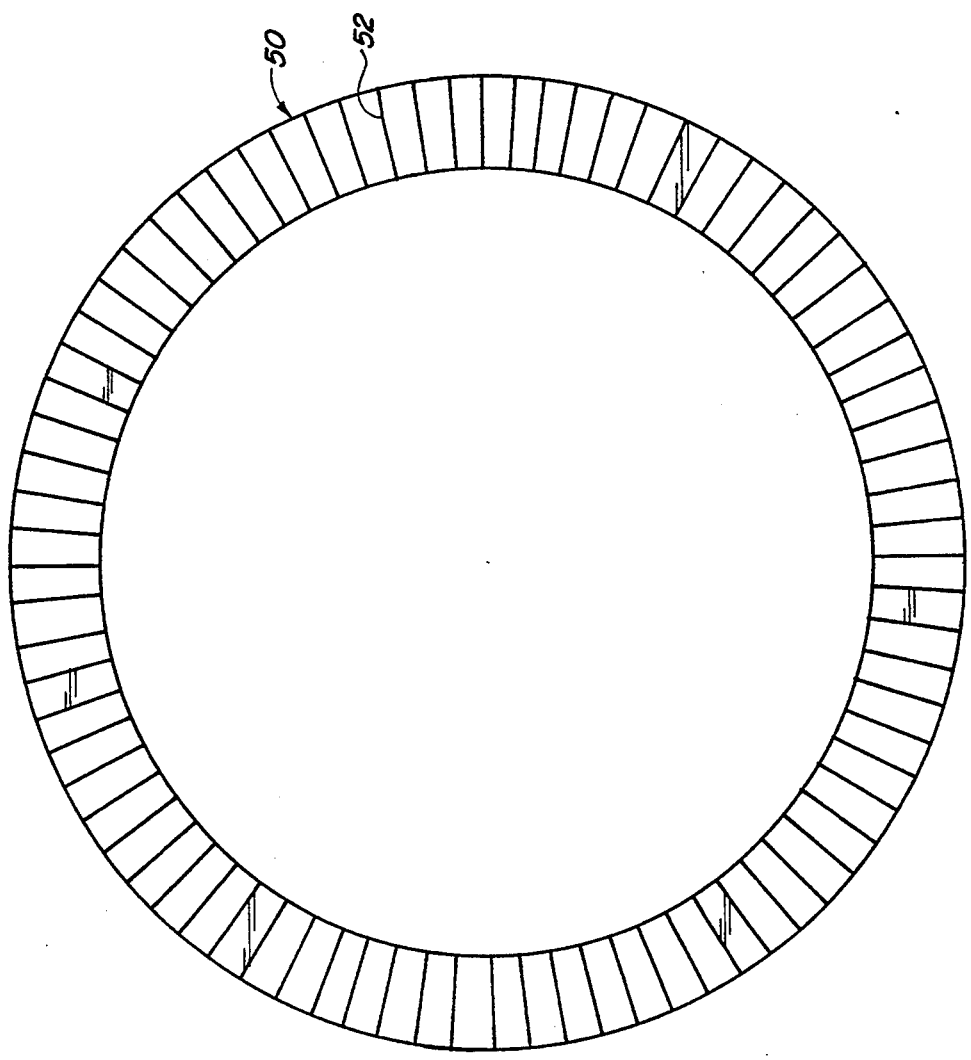
FIG. 5 is a top plan view of the radial blade element of each radial side wall press.
Figure 6:
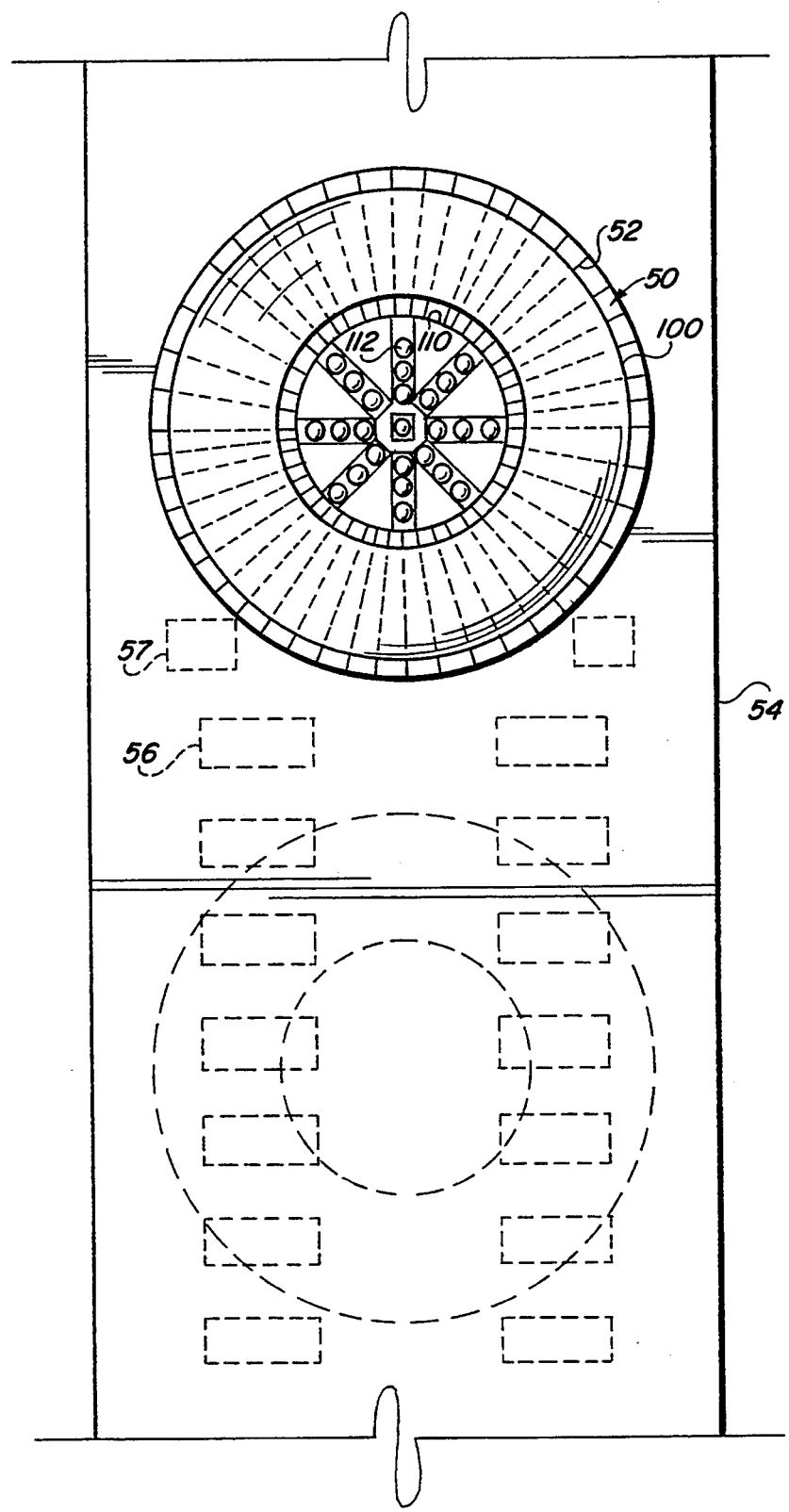
FIG. 6 is a top plan view of the side wall conveyor as it enters the radial side wall press.

As the side wall sections of the tire 100 approach the respective side wall conveyors 12, the gentle slope of the guide troughs 12a disposes the side wall sections flat on a terminal portion of each side wall conveyor 12. Each side wall conveyor 12 terminates in a radial side wall press 32. Each side wall conveyor 12 thus places a side wall section flat, with the interior surface facing upwardly on a radial blade assembly 50, within the radial side wall press 32. A press head 71 then biases each side wall section against a corresponding radial blade assembly 50, where the side wall is cut into multiple small, uniform, roughly pie-shaped tabs by means of multiple radial blades 52, illustrated in FIGS. 5 and 6.

Figure 2:
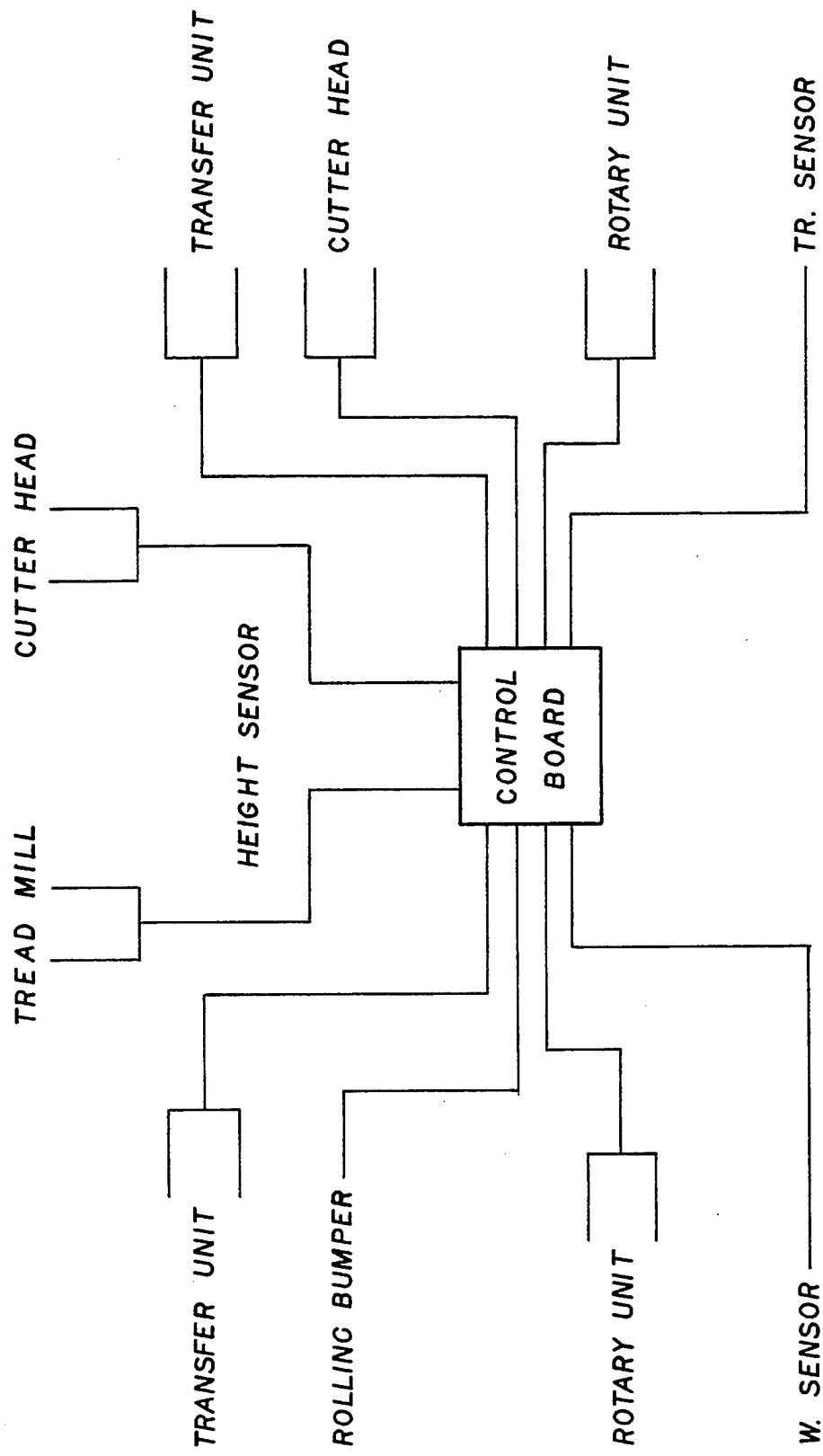
FIG. 2 is a schematic diagram of the electrical connections between the control board and the various subassemblies of the invention.

In order to accommodate a wide range of tire shapes, the present invention includes a control panel and electronic control circuits to control the movement of the various sub-assemblies. FIG. 2 is a schematic showing the connection of the control panel to the various elements of the present invention. The "W. Sensor" indicates the tread side wall width sensor 31, illustrated in FIG. 1, which determines the width of the side wall of the tire 100 about to be processed. The "TR. Sensor" indicates the tread width sensor 30 of the tire 100 and the "Height Sensor" refers to the height sensor 29 and measures the outer diameter of the tire 100. This information is used to automatically guide and set the tread mill 8 and the cutter head 9. Another control function includes a pair of circuits designed to control the time of release of the tire 100 from the rotary transfer units 6 (designated "Transfer Unit" in FIG. 2).

Figure 3:
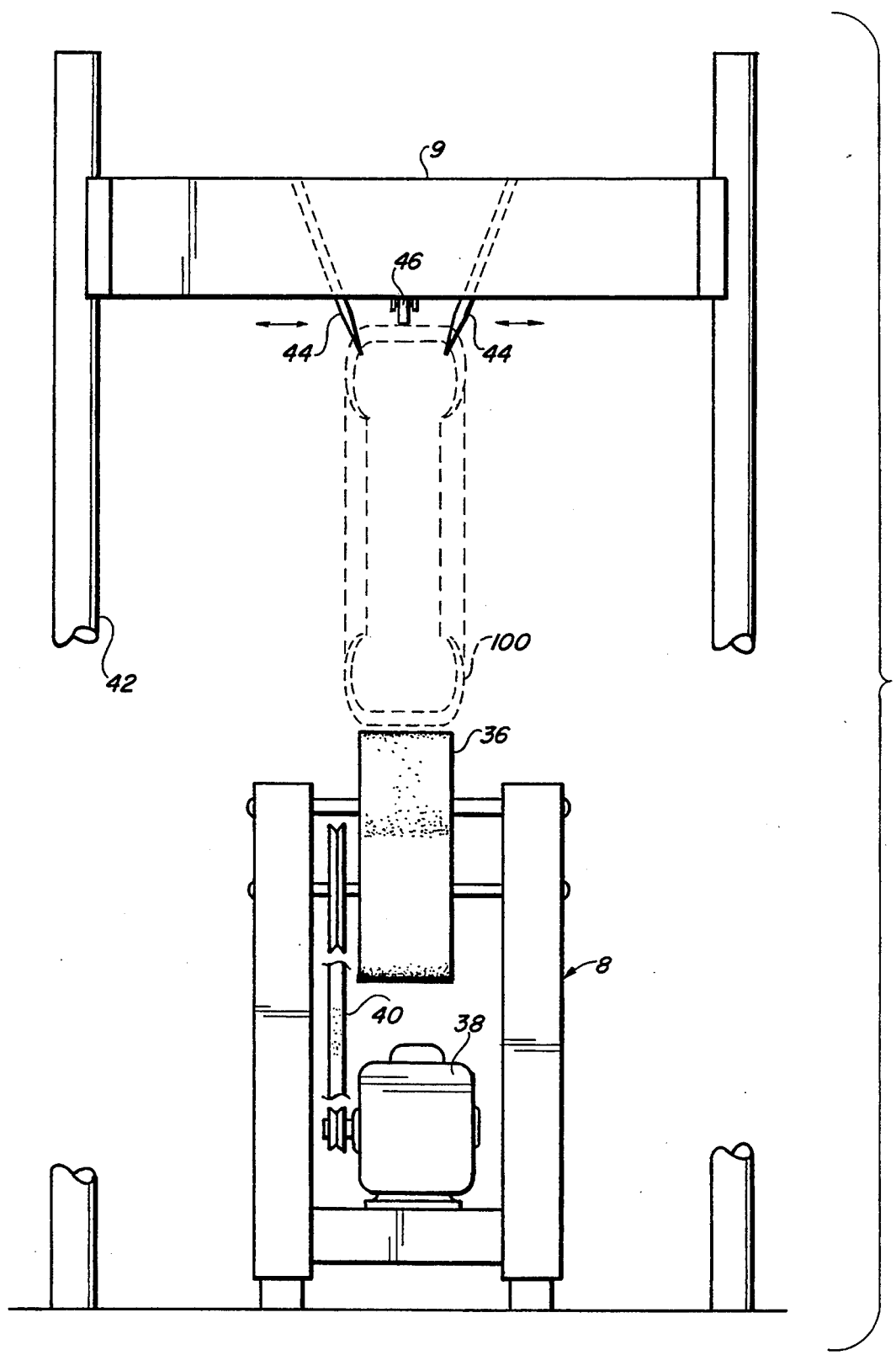
FIG. 3 is a partial cut-away side elevation of the tread mill and cutter head elements of the tire shredding apparatus.
Figure 4:
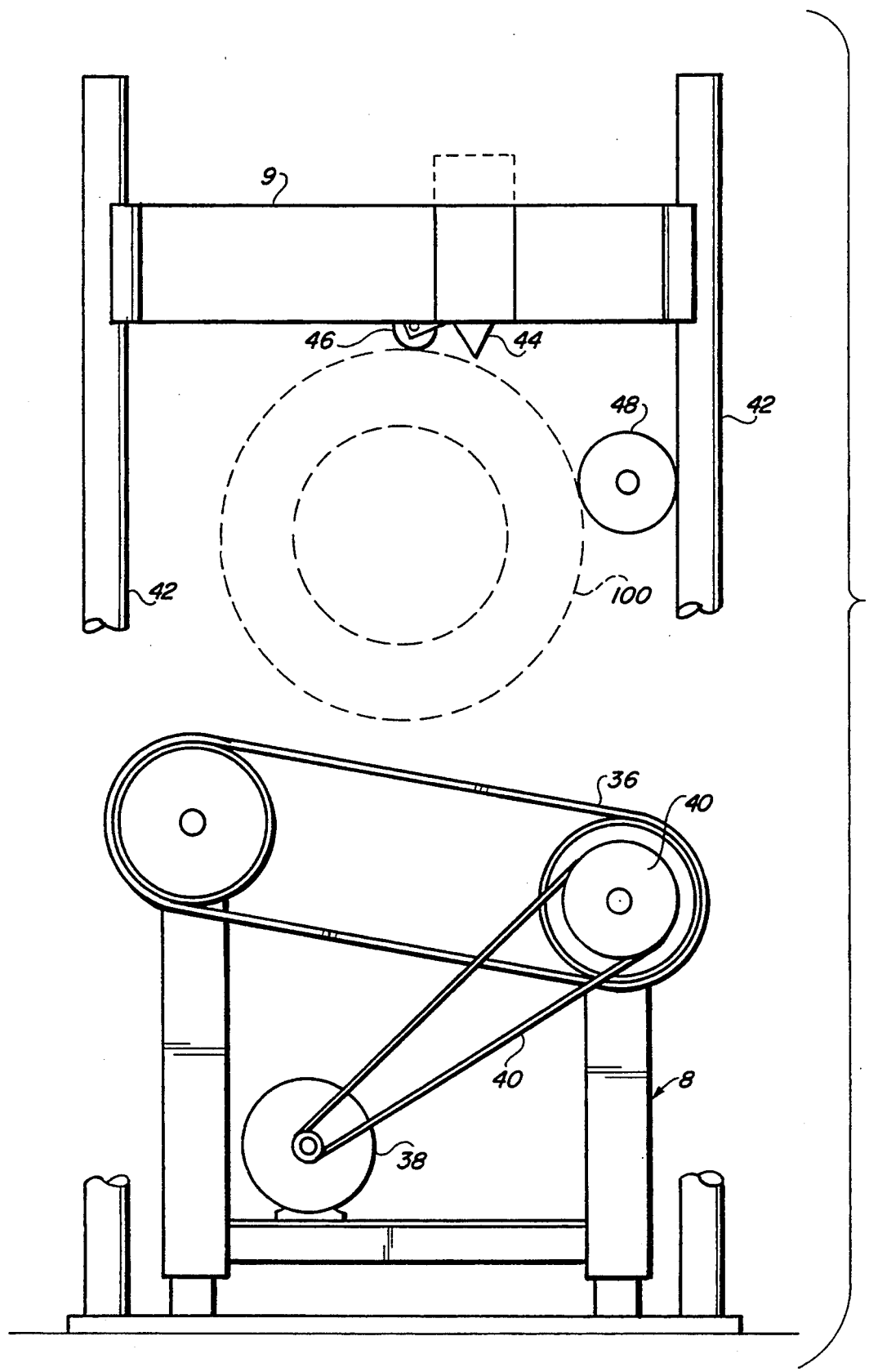
FIG. 4 is a partial cut-away front elevation of the tread mill and cutter head illustrated in FIG. 3.

FIGS. 3 and 4 illustrate a cut-away side elevation and a cut-away front elevation, respectively, of the tread mill 8 and cutter head 9. The rotary transfer units 6 are not shown. The cutter head 9 includes blades 44, a stabilizer 46 and a movable support frame 42. The blades 44 are adjustable in pitch and can be fixed or fixed rotating blades. The stabilizer 46 helps maintain the tire 100 in the proper position and also can be monitored to indicate the rotational speed of the tire 100. The tire 100 is shown in broken lines. The tread mill belt 36, provided in the tread mill 8 and powered by the prime mover 38 and power transfer elements 40, provides initial rotational acceleration to the tire 100.

Figure 11:
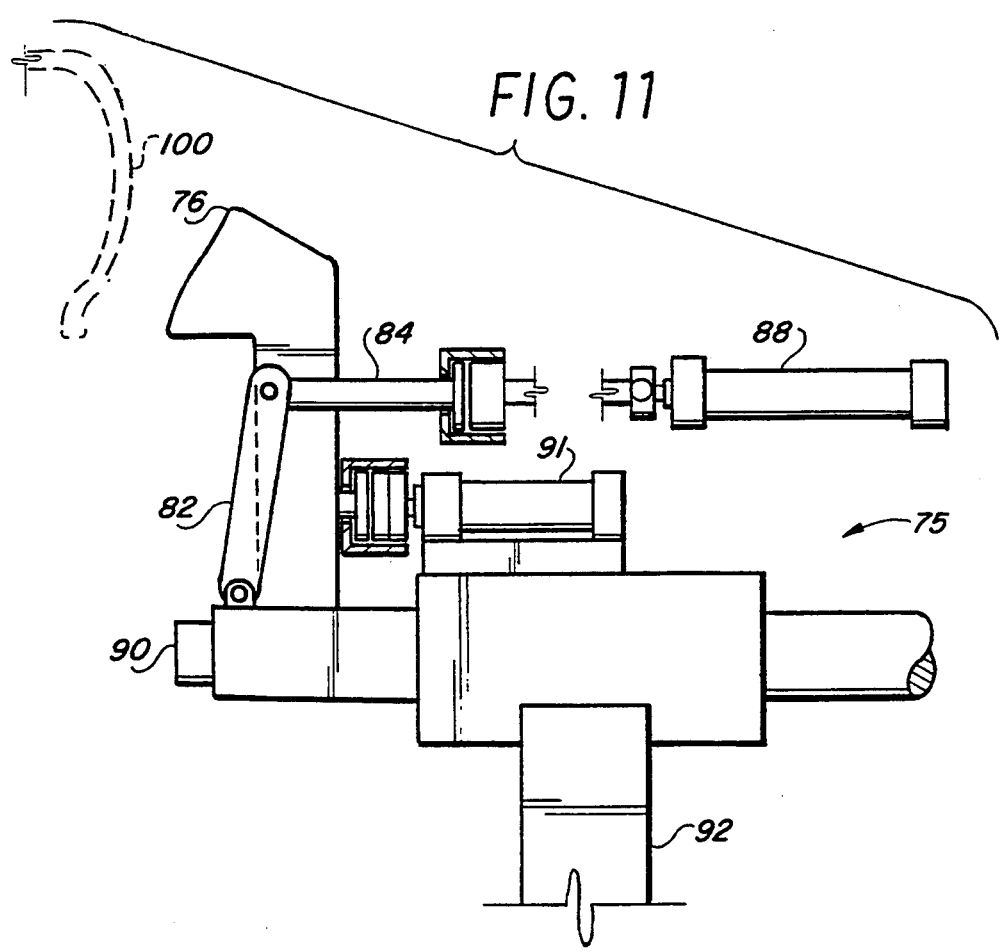
FIG. 11 is a side elevation of a finger assembly of the present invention with the guide platform removed for brevity.
Figure 12:
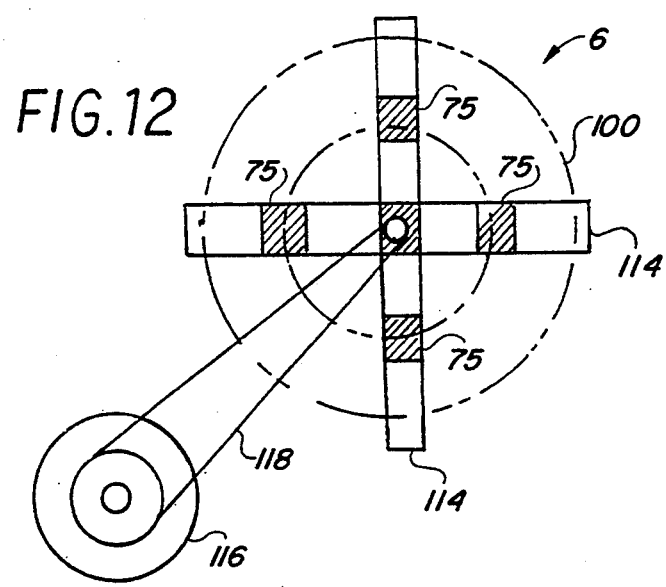
FIG. 12 is a cut-away side elevation of a tire rotary transfer unit.

When the tire 100 first enters the tread mill 8, it has already been scanned by the height sensor 29, tread width sensor 30 and side wall width sensor 31. This scan determines the dimensions of the tire 100. Referring now to FIGS. 11 and 12, immediately after the tire 100 enters the tread mill 8, it is contacted on each side by a rotary transfer unit 6, made up of four finger assemblies 75, equidistantly mounted on a rotatable spindle 114. In sum, there are two such rotatable spindles 114, one on each side of the tire 100 and eight finger assemblies 75, four on each rotatable spindle 114. Depending on the size of the tire 100 being shredded, the apparatus can have as few as three finger assemblies 75 per rotatable spindle 114 or as many as six finger assemblies 75 per rotatable spindle 114. However, four finger assemblies 75 per rotatable spindle 114 are preferred and only one rotatable spindle 114 can be seen in FIG. 12. Since both rotatable spindles 114 are identical and each of the eight finger assemblies 75 are identical, only one of each will be described. Each rotatable spindle 114 is powered by prime mover 116 and power transmitting element 118 and when not under power, the rotatable spindles 114 are freely rotatable on their axes.

Figure 9:
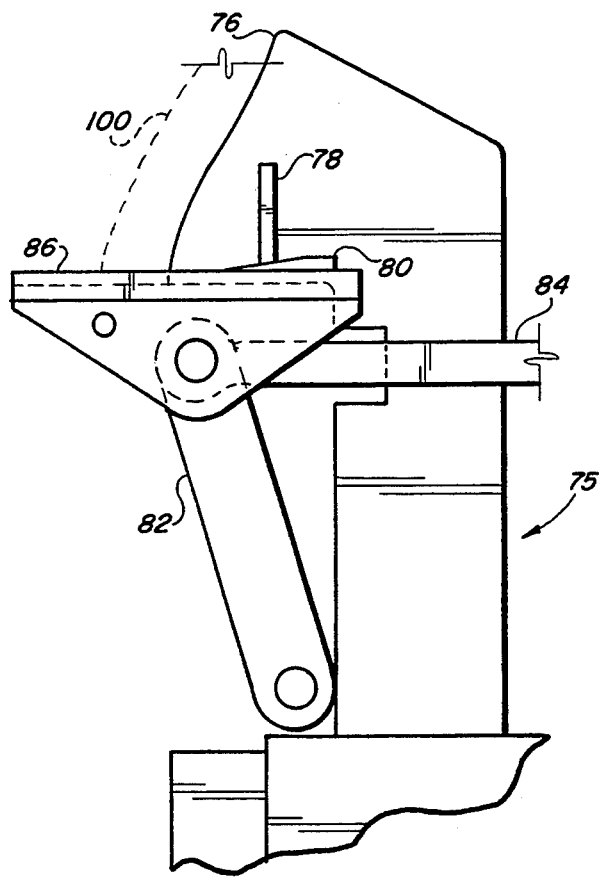
FIG. 9 is a side elevation of finger assembly elements engaging the side wall of a tire.
Figure 10:
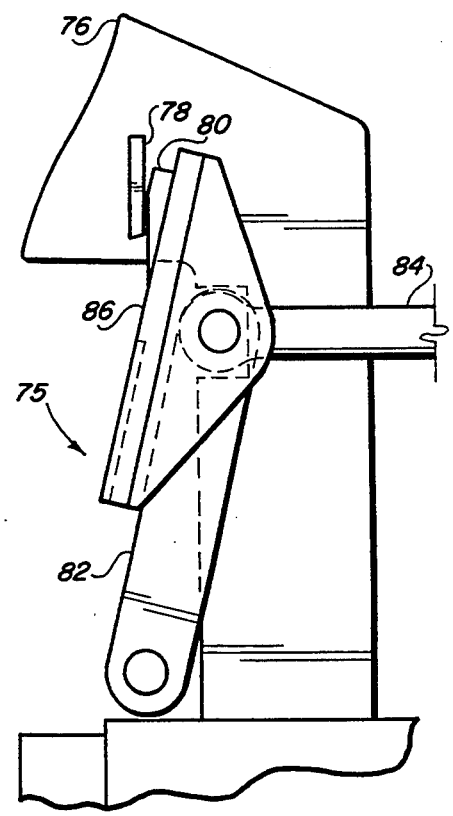
FIG. 10 is a side elevation of finger assembly elements in the tire eject position.

FIG. 11 depicts an enlarged view of the finger assemblies 75, without the guide platforms 86, wherein each finger assembly 75 is slidably mounted on spindle arm 92 via a shaft 90. The entire finger assembly 75 can be automatically adjusted translationally along the longitudinal axis of the shaft 90, via a width adjustment element 91. The width adjustment element 91 may be a hydraulic or pneumatic piston, a ball and screw assembly and the like; however, a ball and screw assembly is preferred. Manipulation of the width adjustment element 91 slides the entire finger assembly 75 along the length of the shaft 90. When the tire 100 first enters the tread mill 8, the finger assemblies 75 are retracted as illustrated in FIG. 10, to allow the tire 100 to easily enter the tread mill 8 area. After the tire 100 has entered the tread mill 8, the finger assemblies 75 are translationally extended as illustrated in FIG. 9, such that the wall supports 76 contact the side walls of the tire 100.

To firmly grasp the side wall of the tire 100, the width ajustment elements 91 are manipulated to place the wall support 76 of each finger assembly 75 in contact with the side wall of tire 100. A finger actuating element 88 is then used to securely bias each wall support 76 and guide platform 86 (see FIG. 9) against the side wall of the tire 100. The finger actuating element 88 may also be a hydraulic or pneumatic piston, a ball and screw assembly and the like, although a ball and screw assembly is preferred. In this manner, the tire 100 is firmly grasped, oriented and centered by the two rotatable spindles 114.

Referring again to FIGS. 9–11, the finger assemblies 75 grasp the tire side walls and beads via the wall supports 76 and the guide platforms 86, respectively. FIG. 9 shows each finger assembly 75 in the grasping position, wherein the wall supports 76 are biased against the tire side wall and the guiding platform 86 supports the bead of tire 100. Each guide platform 86 is swivelled into engagement with the tire 100 by the pivoting action of the corresponding tie rod 82 and connector rod 84, which connect the wall supports 76 and guide platforms 86, respectively, to the finger actuating elements 88, illustrated in FIG. 11. The respective shims 80 and stops 78 allow the travel of the wall supports 76 to be finely adjusted, as needed.

Referring again to FIG. 4 of the drawings, when the tire 100 is secured by the rotary transfer units 6, it is accelerated by the tread mill belt 36 to a speed of from about 120 to 140 revolutions per minute. When the tire 100 nears the target speed, the rotary transfer units 6 (powered by the prime movers 116, as illustrated in FIG. 12) are operated to accelerate the tire 100 to its final rotational speed. When the tire 100 reaches the preset rotational speed, the cutter head 9 is lowered onto the tire 100 to engage the blades 44 therewith. The tire 100 is thusly circumferentially severed in three to six rotations of the tire 100.

As soon as the tire 100 is severed completely, the cutter head 9 is retracted, which allows the tread section to fall free from the two side wall sections. The tread section, still rotating due to its inertia, lands on the tread mill belt 36 and is transported by its rotational momentum onto the tread conveyor 16 and into the tread storage bin 20, as heretofore described. The two side wall sections, one from the right side of the tire, the other from the left side, still gripped by the rotary transfer units 6, are then released from the rotary transfer units 6 by retracting the guide platforms 86 and wall supports 76 of the finger assemblies 75. In the same fashion as the tread section, the rotational inertia and momentum of the side wall sections transport one of each of them into one of each of the two guide troughs 12a and side wall conveyors 12. The two guide troughs 12a and side wall conveyors 12, as well as the two radial side wall presses 32, are identical to each other, respectively. Therefore, for brevity only one of each will be described.

Figure 7A:
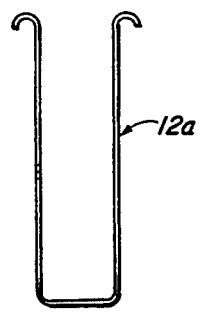
FIGS. 7A through 7G depict sequential cross-sections of the conveyor guide troughs leading from the cutter head to the respective conveyors.
Figure 7B:
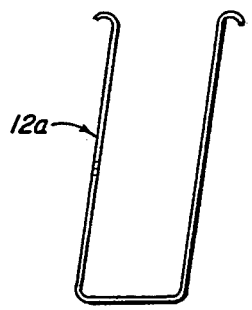
Figure 7C:
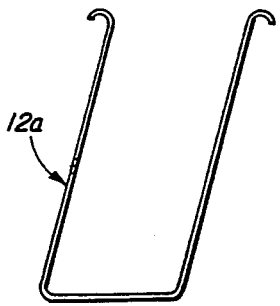
Figure 7D:
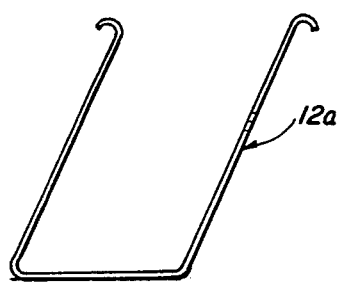
Figure 7E:
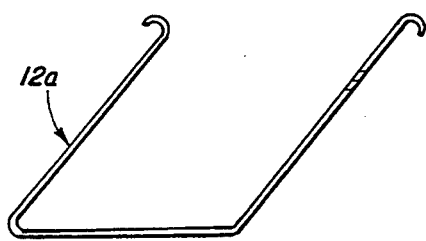
Figure 7F:
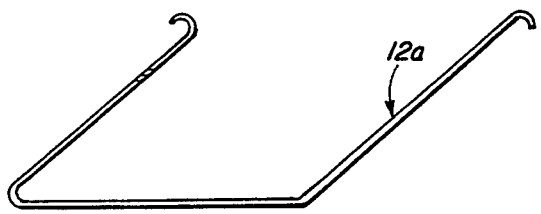
Figure 7G:
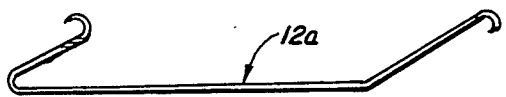

FIGS. 7A through 7G depict sequential cross-sectional views of the walls and floor of the respective guide trough 12a entrances to the corresponding side wall conveyors 12 at the area proximate to the tread mill 8 and leading toward the radial side wall presses 32. FIG. 7a depicts the cross-section of the guide troughs 12a at a first inlet end which is proximate to the tread mill 8. FIG. 7G depicts the cross-section of the guide troughs 12a at a second outlet end, distal to the tread mill 8 and adjacent to the side wall conveyor 12. FIGS. 7B through 7F depict the gradual slope of the walls of the guide troughs 12a as they extend from the first inlet end to the second outlet end. The respective tire side walls exit the tread mill 8 area still in a vertical orientation and enter the corresponding guide troughs 12a and the side wall conveyors 12. Here, the decreasing slope of the walls of the guide troughs 12a re-orients the tire side wall sections into a flat, horizontal position, and deposit the side wall sections (illustrated in phantom in FIG. 6) onto a conveyor frame 54, also depicted in FIG. 6. (i.e., The main axes of the tire side wall sections are now horizontal.)

Figure 8:
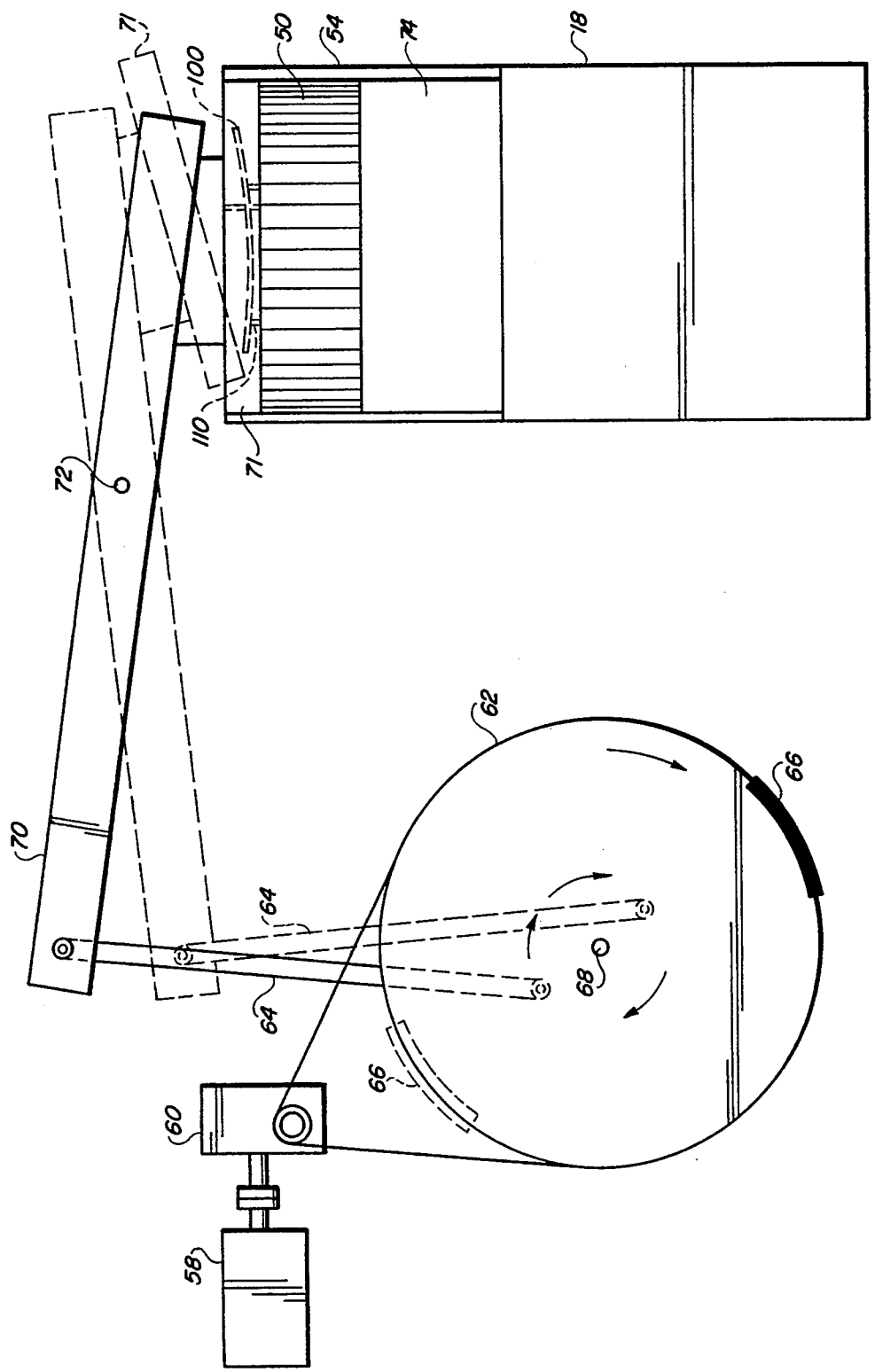
FIG. 8 shows a schematic of the radial side wall press or tread press.

Each tire side wall, now laying flat, is guided by rollers 56 and guide rollers 57 onto a radial blade assembly 50, mounted slightly lower than the surface of the conveyor frame 54. Each tire side wall section is then centered on the respective radial blade assembly 50, having multiple radial blades 52 (shown in FIGS. 5 and 6)) by a tire-centering dome 110. The tire-centering dome 110 is slightly elevated from the surface of the conveyor frame 54 and is covered by multiple friction-reducing elements 112. The outer diameter of each tire centering dome 110 is smaller than the inner diameter of the tire side wall being shredded, and serves to center the tire side wall on the corresponding radial blade assembly 50 by contact with the inner diameter of the tire side wall. Each tire side wall is now in position to be rendered into multiple wedge-shaped tabs. This cutting operation is facilitated by press heads 71, shown in FIG. 8. Each press head 71 is mounted on one end of a lever arm 70, which reciprocates the press head 71 into engagement with the corresponding radial blade assembly 50, thereby forcing the tire side walls through the radial blade assembly 50. This action renders the tire side wall into multiple tabs. The tabs so made then exit through the bottom side of the radial blade assembly 50, fall through a tab chute 74 and land on the discharge conveyor 18. The mechanism for reciprocating the press head 71 includes a prime mover 58, a reducer 60, a flywheel 62, and a pitman 64. The flywheel 62 and pitman 64 are operationally stabilized by a counterbalance 66 and the pitman 64 is pivoted to the lever arm 70 near a flywheel shaft 68, whereby rotary motion of the prime mover 58 drives the press head 71 in a reciprocating motion.

By synchronizing the speed of the motors which power the various sub-assemblies, tires 100 in a wide range of sizes can be quickly and automatically sized, split and rendered into tabs of uniform size and shape. If desired, the tread sections, normally stored in the tread storage bin 20, can be rendered in a separate radial press 34, having a separate input 35 and control panel 28, as illustrated in FIG. 1. This is accomplished by manually placing the tread sections one-by-one into the radial press 34, which is functionally identical to the radial side wall presses 32, described above. The chopped segments of tread sections are transported from the radial press 34 by means of a product conveyor 26 to the discharge conveyor 18.

In operation, and referring again to the drawings, a tire 100 is placed in the tire input chute 10, where it rolls into the tread mill 8. En route to the tread mill 8, the dimensions of the tire 100 are automatically determined by the height sensor 29, tread width sensor 30 and side wall width sensor 31. Once in the tread mill 8, the tire 100 is grasped by the rotary transfer units 6 and rotationally accelerated by the tread mill belt 36. At a preset speed, continued rotation of the tire 100 is assured by the rotatable spindles 114, driven by the prime mover 116. The cutter head 9 is then lowered onto the tire 100, thereby rendering it into a right-side wall section, a left-side wall section and a center tread section. The center tread section freely falls away from the two side wall sections and is carried by its own momentum into the tread storage bin 20. The two side wall sections are released from the rotary transfer units 6 and are carried by their own momentum through the respective guide troughs 12a and side wall conveyors 12 and into the corresponding tire radial side wall presses 32, where they are cut into multiple, relatively small, uniform pieces by each radial blade assembly 50 in cooperation with the corresponding press head 71.

It is to be understood that the present invention is not limited to the embodiments described above, but encompasses any and all embodiments falling within the scope of the attached claims.

Having described my invention with the particularity set forth above, I claim:

1. An automated tire shredding apparatus comprising:
   (a) releasable tire orienting and rotating means for engaging and vertically orienting and rotating a tire;
   (b) a prime mover operationally connected to said releasable tire orienting and rotating means by power transmitting elements;
   (c) a movable cutter head, including at least two adjustable cutter head blades, said cutter head and said cutter head blades movably engageable with the tire when the tire is rotated by the releasable tire orienting and rotating means, said cutter head blades being capable of cutting circumferentially through the tire;
   (d) two tire side wall conveyor means, each of said tire side wall conveyor means having a floor, two walls, an inlet end and an outlet end, said inlet end being dimensioned and configured to retain a tire side wall in a substantially vertical orientation and said outlet end being dimensioned and configured to retain a tire side wall in a substantially horizontal orientation and said two walls gradually sloping to connect said inlet end with said outlet end;
   (e) two horizontally disposed radial blade assemblies, with one of said radial blade assemblies disposed adjacent to said outlet end of each of said side wall conveyors, respectively, each of said radial blade assemblies having a plurality of radially disposed blades;
   (f) two press heads, with one of said press heads operationally disposed adjacent to one of said radial blade assemblies and the other of said press heads operationally disposed adjacent to the other of said radial blade assemblies, each of said press heads capable of reciprocating between a first position removed from said radial blade assemblies for receiving a tire side wall and a second position flush with said radial blade assemblies for radially cutting a tire side wall; and
   (g) a prime mover operationally connected to said press heads, whereby said tire is circumferentially cut by said cutter head blades to define a tire tread and a pair of tire side walls and said tire side walls are transported by rotational momentum to said radial blade assemblies, where said tire side walls are radially cut into pieces responsive to operation of said radial blade assemblies, said radially-disposed blades and said press heads.

2. The automated tire shredding apparatus according to claim 1 comprising first, second and third sensors, said first sensor responsive to the tread width of the tire, said second sensor responsive to the side wall width of the tire and said third sensor responsive to the outer diameter of the tire, said first, second and third sensors electrically connected to said releasable tire orienting and rotating means for adjusting said releasable tire orienting and rotating means to the dimensions of the tire.

3. The automated tire shredding apparatus according to claim 1 wherein said releasable tire orienting and rotating means comprises two rotatably-driven spindles, each of said spindles having a horizontal axis of rotation which is collinear to the other of said spindles, each of said spindles further having a plurality of adjustable finger assemblies thereon, said plurality of adjustable finger assemblies capable of releasably and rotatably fixing the tire between said spindles.

4. The automated tire shredding apparatus of claim 3 comprising first, second and third sensors, said first sensor responsive to the tread width of the tire, said second sensor responsive to the side wall width of the tire and said third sensor responsive to the outer diameter of the tire, said first second and third sensors electrically connected to said releasable tire orienting and rotating means for adjusting said releasable tire orienting and rotating means to the dimensions of the tire.

5. The automated tire shredding apparatus according to claim 4 wherein said plurality of adjustable finger assemblies comprises four equidistantly spaced finger assemblies.

6. The automated tire shredding apparatus according to claim 3 comprising a horizontally disposed, endless, driven band member disposed between said spindles for supporting the tire.

7. The automated tire shredding apparatus according to claim 6 comprising first, second and third sensors, said first sensor responsive to the tread width of the tire, said second sensor responsive to the side wall width of the tire and said third sensor responsive to the outer diameter of the tire, said first second and third sensors electrically connected to said releasable tire orienting and rotating means for adjusting said releasable tire orienting and rotating means to the dimensions of the tire.

8. The automated tire shredding apparatus according to claim 6 wherein said plurality of adjustable finger assemblies comprises four equidistantly spaced finger assemblies.

9. The automated tire shredding apparatus according to claim 6 comprising first, second and third sensors, said first sensor responsive to the tread width of the tire, said second sensor responsive to the side wall width of the tire and said third sensor responsive to the outer diameter of the tire, said first, second and third sensors electrically connected to said releasable tire orienting and rotating means for adjusting said releasable tire orienting and rotating means to the dimensions of the tire and wherein said plurality of adjustable finger assemblies comprises four equidistantly spaced finger assemblies.

10. The automated tire shredding apparatus according to claim 1 comprising two tire-centering domes, each of said tire centering domes including an upper surface having friction-reducing elements and one of each of said tire-centering domes being located in a center of an upper surface of each of said radial blade assemblies for centering the tire side walls in said radial blade assemblies.

11. The automated tire shredding apparatus according to claim 10 comprising first, second and third sensors, said first sensor responsive to the tread width of the tire, said second sensor responsive to the side wall width of the tire and said third sensor responsive to the outer diameter of the tire, said first second and third sensors electrically connected to said releasable tire orienting and rotating means for adjusting said releasable tire orienting and rotating means to the dimensions of the tire.

12. The automated tire shredding apparatus according to claim 11 wherein said releasable tire orienting and rotating means comprises two rotatably-driven spindles, each of said spindles having a horizontal axis of rotation which is collinear to the other of said spindles, each of said spindles further having a plurality of adjustable finger assemblies thereon, said plurality of adjustable finger assemblies capable of releasably and rotatably fixing the tire between said spindles.

13. The automated tire shredding apparatus according to claim 12 wherein said plurality of adjustable finger assemblies comprises four equidistantly spaced finger assemblies.

14. The automated tire shredding apparatus according to claim 13 comprising a horizontally disposed, endless, driven band member disposed between said spindles for supporting the tire.

15. An automated tire shredding apparatus comprising:
   (a) sensor means for sizing a tire;
   (b) releasable tire orienting and rotating means electrically connected to said sensor means for engaging and vertically orienting and rotating the tire;
   (c) a prime mover operationally connected to said releasable tire orienting and rotating means by power transmitting elements;
   (d) a movable cutter head, including at least two adjustable cutter head blades, said cutter head and said cutter head blades movably engageable with the tire when the tire is rotated by the releasable tire orienting and rotating means, said cutter head blades being capable of cutting through the tire;
   (e) two side wall conveyor means extending from said movable cutter head;
   (f) two horizontally disposed radial blade assemblies, with one of said radial blade assemblies disposed adjacent to each of said side wall conveyor means, respectively, each of said radial blade assemblies having a plurality of radially disposed blades;
   (g) two press heads, with one of said press heads operationally disposed adjacent to one of said radial blade assemblies and the other of said press heads operationally disposed adjacent to the other of said radial blade assemblies, each of said press heads capable of reciprocating between a first position removed from said radial blade assemblies for receiving a tire side wall and a second position flush with said radial blade assemblies for cutting a tire side wall; and
   (h) a prime mover operationally connected to said press heads, whereby said tire is circumferentially cut by said cutter head blades to define a tire tread and a pair of tire side walls and said tire side walls are transported by rotational momentum across said side wall conveyor means to said radial blade assemblies, where said tire side walls are radially cut into pieces responsive to operation of said radial blade assemblies, said radially-disposed blades and said press heads.

16. The automated tire shredding apparatus according to claim 15 comprising at least one discharge conveyor disposed below each of said radial blade assemblies for transporting the pieces of said tire side walls away from said radial blade assemblies.

17. The automated tire shredding apparatus according to claim 16 comprising a linear tread conveyor disposed adjacent to said releasable tire orienting and rotating means for transporting the tire tread from said releasable tire orienting and rotating means.

18. A method of shredding a tire having a main axis of rotation into a plurality of substantially uniformly-sized pieces, comprising the steps of;
   (a) orienting and releasably and rotatably fixing said tire such that said main axis of rotation is horizontal;
   (b) rotating said tire about said main axis of rotation;
   (c) contacting said rotating tire with a plurality of cutting means for circumferentially slitting said tire into at least one center tread section and right and left side wall sections, each of said right and left side wall sections rotating about said main axis of rotation, whereby said center tread section falls free of said right and left side wall sections and said center tread section is transported by its rotational momentum away from said right and left side wall sections;
   (d) releasing said right and left side wall sections, whereby said right and left side wall sections are each transported by their rotational momentum to one of two radial cutting presses;
   (e) biasing each of said right and left side wall sections against a blade assembly, said blade assembly including a plurality of blades; and
   (f) radially cutting each of said right and left side wall sections into a plurality of substantially uniformly-sized pieces by operation of said plurality of blades.

19. The method of shredding tires according to claim 18 further comprising the step of subsequent to releasing said right and left side wall sections and prior to biasing each of said right and left side wall sections against a blade assembly, reorienting said right and left side wall sections such that their main axis of rotation is vertical.

20. The method of shredding tires according to claim 19 further comprising the step of automatically transporting said plurality of uniformly-sized pieces away from said blade assembly.

* * * * *